United States Patent
Kwon et al.

(10) Patent No.: US 11,284,295 B1
(45) Date of Patent: Mar. 22, 2022

(54) RELIABLE EFFICIENT FLOODING IN MANET

(71) Applicant: Rockwell Collins, Inc., Cedar Rapids, IA (US)

(72) Inventors: Tj T. Kwon, Marion, IA (US); Thomas L. Tapp, Cedar Rapids, IA (US); Ian R. Worden, Marion, IA (US); Scott A. Bailey, Marion, IA (US); Wayne H. Meyer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/707,111

(22) Filed: Dec. 9, 2019

Related U.S. Application Data

(63) Continuation-in-part of application No. 16/369,398, filed on Mar. 29, 2019, now Pat. No. 10,979,348.

(51) Int. Cl.
  *H04W 28/04* (2009.01)
  *H04W 40/02* (2009.01)
  *H04W 84/18* (2009.01)

(52) U.S. Cl.
  CPC ......... *H04W 28/04* (2013.01); *H04W 40/023* (2013.01); *H04W 84/18* (2013.01)

(58) Field of Classification Search
  CPC .............................. H04W 28/04; H04W 84/18
  USPC ....................................................... 370/310
  See application file for complete search history.

(56) References Cited

U.S. PATENT DOCUMENTS

| | | | |
|---|---|---|---|
| 7,242,671 B2 | 7/2007 | Li et al. | |
| 7,719,989 B2 | 5/2010 | Yau | |
| 8,630,291 B2 | 1/2014 | Shaffer et al. | |
| 9,179,475 B2 | 11/2015 | Koleszar et al. | |
| 9,544,162 B2 | 1/2017 | Vasseur et al. | |
| 2004/0246902 A1 | 12/2004 | Weinstein et al. | |
| 2007/0097880 A1* | 5/2007 | Rajsic | H04L 45/04 370/254 |
| 2016/0150465 A1* | 5/2016 | Jung | H04W 52/0209 370/254 |

FOREIGN PATENT DOCUMENTS

WO  2012165938 A1  12/2012

* cited by examiner

*Primary Examiner* — Angel T Brockman
(74) *Attorney, Agent, or Firm* — Suiter Swantz pc llo

(57) ABSTRACT

A system and method for managing acknowledgments and retransmissions in a distributed manner in a MANET with 2-hop clustering structure. Clusterheads are in charge of assuring delivery of flooding packets to their members. After receiving acknowledgments from associated nodes in the cluster, and clusterheads perform retransmission when necessary with a list of acknowledging nodes. The non-clusterhead nodes receive the retransmissions and determine if that node's acknowledgment was received based on a list of node IDs included in the retransmission. If the node ID is not listed, the node resends the acknowledgment. The process continues until all acknowledgments are received and listed.

13 Claims, 12 Drawing Sheets

RELIABLE EFFICIENT FLOODING IN MANET

PRIORITY

The present application claims the benefit under 35 U.S.C. § 120 of U.S. patent application Ser. No. 16/369,398 (filed Mar. 29, 2019), which is incorporated herein by reference.

BACKGROUND

Mobile ad-hoc networks (MANETs) are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like.

Currently, packet flooding is one of the only techniques which may be used to deliver a data packet to a particular destination without knowing the route or network topology. There are several types of flooding including blind flooding, efficient flooding with multi-point relay (MPR), and efficient flooding with passive clustering (EFPC), and like. However, each of these flooding techniques suffer from respective drawbacks.

For example, blind flooding inevitably results in unnecessary broadcasting, which results in rapidly increasing costs as the network density increases. Similarly, multi-point relay (MPR) results in increasing gain and overhead as the network density increases.

In all cases, verifying delivery may be more expensive in terms of overhead than flooding itself. Collecting acknowledgments is challenging because acknowledgements and re-transmissions require multi-hop communication by MANET nature. A complete set of destinations is unknown and identifying all the connected nodes takes time. Furthermore, nodes may lose the connectivity at any time. Unnecessary acknowledgment waiting and re-transmission, and redundant acknowledgments consume significant bandwidth and time. Large MANETs cannot tolerate the additional overhead of acknowledgments and re-transmissions.

SUMMARY

In one aspect, embodiments of the inventive concepts disclosed herein are directed to a system and method for managing acknowledgments in a MANET. Clusterheads in the MANET receive acknowledgments from associated nodes in the cluster and perform re-transmission when necessary with a list of acknowledging nodes.

In a further aspect, the non-clusterhead nodes receive retransmissions and determine if that node's acknowledgment was received based on a node ID included in the retransmission. If the node ID is not listed, the node resends the acknowledgment. This eliminates multi-hop acknowledgments and re-transmissions, which reduces the overhead significantly.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
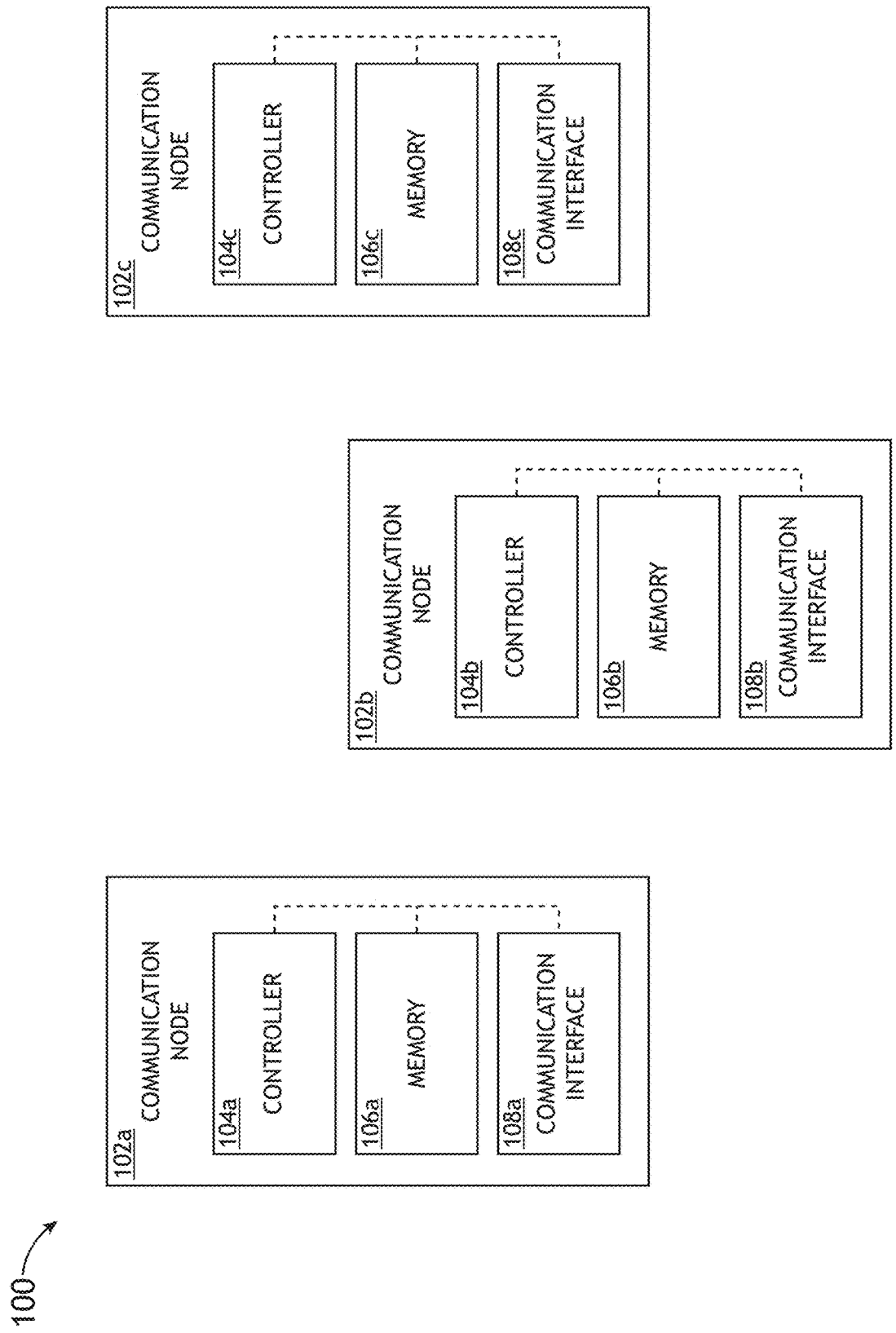
FIG. 1 illustrates a multi-node communication network, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1 a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to Clusterheads in the MANET receive acknowledgments from associated nodes and perform re-transmission when necessary.

FIG. 1 illustrates a multi-node communication network 100, in accordance with an example embodiment of the present disclosure. In embodiments, the multi-node communication network 100 may include a plurality of communication nodes 102. For example, the multi-node communication network 100 may include a first communication node 102a, a second communication node 102b, and a third communication node 102c.

The multi-node communication network 100 may include any multi-node communication network. For example, the multi-node communication network 100 may include a mobile ad-hoc network (MANET) in which each communication node 102 within the multi-node communication network is able to move freely and independently. Similarly, the one or more communication nodes 102 may include any communication node which may be communicatively coupled. In this regard, the one or more communication nodes 102 may include any communication node for transmitting/transceiving data packets. For example, the one or more communication nodes 102 may include, but are not limited to, radios, mobile phones, smart phones, tablets, smart watches, laptops, and the like.

Each communication node 102 of the one or more communication nodes 102a, 102b,102cmay include, but is not limited to, a respective controller 104 (e.g., controller 104a, 104b, 104c, etc.), memory 106 (e.g., memory 106a, 106b, 106c, etc.), and communication interface 108 (e.g., communication interface 108a, 108b, 108c, etc.).

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/controller 104, such as software programs and/or code segments, or other data to instruct the controller 104, and possibly other components of the communication node 102, to perform the functionality described herein. Thus, the memory 106 can store data, such as a program of instructions for operating the communication node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communication node 102 may be configured to communicatively couple to additional communication interfaces 108 of additional communication nodes 102 of the multi-node communication network 100 using any wireless communication techniques including, but not limited to, GSM, GPRS, CDMA, EV-DO, EDGE, WiMAX, 3G, 4G, 4G LTE, 5G, WiFi protocols, RF, LoRa, and the like.

In embodiments, the controller 104 of a communication node 102 is configured to carry out various steps and functions of the present disclosure. The controller may be configured to: receive a data packet, via the communication interface, from a first communication node of the multi-node communication network; determine a number of gateway nodes and a number of clusterhead nodes communicatively coupled to the communication node; determine a clustering status of the communication node, the clustering status based on a relationship between the determined number of gateway nodes and the determined number of clusterhead nodes; and transmit the data packet, via the communication interface, to at least one additional communication node of the multi-node communication network if the determined clustering status is a gateway clustering status or a clusterhead clustering status. Each of these steps may be addressed in turn.

In embodiments, a controller 104 of a communication node 102 of a multi-node communication network 100 is configured to receive a data packet transmitted by an additional communication node 102 within the multi-node communication network 100. For example, the first communication node 102a may transmit a data packet to the second communication node 102b. The controller 104b of the second communication node 102b may then be configured to receive the data packet from the communication interface 108b.

Communication nodes 102 of the multi-node communication network 100 may be "clustered" or otherwise identified according to a plurality of clustering statuses. For example, a communication node 102 may be classified, clustered, or otherwise identified according to a clustering status including an "initial node" clustering status, an "ordinary node" clustering status, a "gateway node" clustering status, or a "clusterhead node" clustering status. In this regard, each communication node 102 of the multi-node communication network 100 may be identified according to a respective clustering status. According to embodiments of the present disclosure, a first clusterhead node may not be directly communicatively coupled to an additional clusterhead node (e.g., a first clusterhead node may not be one-hop neighbors with an additional clusterhead node). In further embodiments, ordinary nodes within the multi-node communication network 100 may be capable of initiating flooding, but may be discouraged, prevented, or may otherwise refrain from, relaying and/or re-transmitting flooding data packets. Differences between communication nodes 102 of varying clustering statuses will be discussed in further detail herein.

In embodiments, data packets transmitted by communication nodes 102 within the multi-node communication network 100 may include a broadcast address indicative of the clustering status of the transmitting node. The broadcast addresses may be included within the header of a transmitted data packet. For example, the data packet transmitted by the first communication node 102a to the second communication node 102b may include a header which includes a broadcast address of the first communication node 102a, wherein the broadcast address is indicative of the clustering status of the first communication node 102a.

The multi-node communication network 100 may generally operate according to the teachings of U.S. patent application Ser. No. 16/369,398 (filed Mar. 29, 2019). The clustering structure may be implemented to receive acknowledgments at clusterhead nodes to prevent two-hop acknowledgments.

In embodiments, a controller 104 of a communication node 102 of a multi-node communication network 100 is configured to determine a number of gateway nodes and a number of clusterhead nodes communicatively coupled to the communication node 102. The controller 104 of the communication node 102 is configured to determine the number of gateway nodes and the number of communication nodes communicatively coupled to the communication node 102 by referencing a local list stored in the memory 106 of the communication node. In embodiments, the local list of communication nodes 102 may include various pieces of information regarding the neighboring nodes of communication node 102b. In the event a communication node 102 is present within the local list, the controller 104 may be configured to update the clustering status and communication time-stamp of the communication node 102 within the local list. Due to the fact that the local list may be updated on a regular, irregular, or intermittent basis, the clustering status of each communication node 102 may be regarded as a "soft state."

Additionally, the controller 104 may be configured to update the communication time-stamp of the first communication node 102a to the time the data packet was received (e.g., the current time). By updating the communication time-stamp of the first communication node 102a to the current time, the local list then shows that the first communication node 102a was recently communicatively coupled to the second communication node 102b. Additionally, by updating the communication time-stamp of the first communication node 102a to the current time, the time-out period for the first communication node 102a would effectively be reset.

It should be noted herein that, in practice, the controller 104 may be configured to identify and remove one or more timed-out communication nodes 102 from the local list prior to determining the number of neighboring gateway nodes and the number of neighboring clusterhead nodes. By removing timed-out communication nodes first, the controller 104 may ensure the list of communication nodes 102 within the local list is accurate and "fresh," and may thereby more accurately determine the number of neighboring gateway/clusterhead nodes.

In embodiments, clusterhead nodes may not be neighbors with other clusterhead nodes. In this regard, two clusterhead nodes may not be directly communicatively coupled to one another such that they make up "one-hop" neighbors. Therefore, a communication node 102 in clusterhead clustering state may not include a list of clusterhead nodes within the local list stored in memory 106.

In embodiments, the controller 104 may be further configured to determine a clustering status of the communication node 102. For example, upon receiving the data packet from the first communication node 102a, the controller 104b of the second communication node 102b may be configured to determine the clustering status of the second communication node 102b. In some embodiments, the clustering status of the communication node may be determined based on a relationship between the determined number of gateway nodes and the determined number of clusterhead nodes.

For example, if the determined number of the clustering status of a communication node 102 (e.g., second communication node 102b) may be determined according to Equation 1 and Equation 2.

$$GW \geq \alpha *CH+\beta \quad (1)$$

$$GW < \alpha *CH+\beta \quad (2)$$

wherein GW defines the determined number of gateway nodes, CH defines the determined number of clusterhead nodes, and $\alpha$ and $\beta$ define gateway redundancy factors. In embodiments, if Equation 1 is found to be true, a controller 104 may be configured to determine the clustering status of the communication node 102 to be an ordinary node clustering status. Conversely, if Equation 2 is found to be true, a controller 104 may be configured to determine the clustering status of the communication node 102 to be a gateway node clustering status.

An example may prove to be illustrative. For the purposes of this example, the gateway redundancy factors $\alpha$ and $\beta$ may both be defined to equal one. In this example, the controller 104b of the second communication node 102b may search the local list stored in memory 106b to determine the number of neighboring gateway nodes is three (e.g., GW=3) and the number of neighboring clusterhead nodes equals one (e.g., CH=1). In this example, the controller 104b may determine that Equation 1 is true (GW≥α*CH+β:3≥2). Accordingly, the controller 104b may determine the clustering status of the second communication node 102b to be an ordinary node clustering status.

Consider another example in which the gateway redundancy factors $\alpha$ and $\beta$ may both be defined to equal one. In this example, the controller 104b of the second communication node 102b may search the local list stored in memory 106b to determine the number of neighboring gateway nodes is three (e.g., GW=3) and the number of neighboring clusterhead nodes equals three (e.g., CH=3). In this example, the controller 104b may determine that Equation 2 is true GW<α*CH+β:3<4). Accordingly, the controller 104b may determine the clustering status of the second communication node 102b to be a gateway node clustering status.

In embodiments, the controller 104 of a communication node 102 is configured to transmit (or not transmit) the received data packet depending on the determined clustering status of the communication node. In this regard, communication nodes 102 within the multi-node communication network 100 may be regarded as routers configured to "relay" received data packets. For example, in embodiments, the controller 104 may be configured to cause the communication interface 108 of the communication node 102 to transmit the received data packet to one or more additional communication nodes 102 if the determined clustering status of the communication node is a gateway clustering status or a clusterhead clustering status. Conversely, the controller 104 may be configured to stop, prohibit, or otherwise refrain from transmitting the received data packet if the determined clustering status of the communication node is an ordinary node clustering status.

As noted previously herein, data packets transmitted by communication nodes 102 within the multi-node communication network 100 may include a broadcast address indicative of the clustering status of the transmitting node. Data packets may additionally include the MAC address of the transmitting communication node 102. In this regard, the data packets relayed by a clusterhead node and/or a gateway node may include both the MAC address of the respective transmitting node, and a broadcast address indicative of the clustering status of the transmitting node.

In traditional flooding approaches, all nodes, including ordinary nodes, participate in flooding. Conversely, by refraining from transmitting a received data packet if the determined clustering status of a communication node 102 is an ordinary node clustering status, ordinary nodes within the multi-node communication network 100 are effectively estopped from participating in flooding. It is contemplated herein that this non-participation of ordinary nodes in flooding procedures may allow for improved flooding efficiency on the fly, while not degrading the delivery ratio. Additionally, by preventing ordinary nodes from participating in flooding, unnecessary and duplicative data transmissions may be reduced, thereby increasing the available bandwidth within the multi-node communication network 100.

In embodiments, the gateway redundancy factors $\alpha$ and $\beta$ in Equation 1 and Equation 2 may be manually and/or automatically adjusted to control the number and density of gateway nodes (and therefore number of ordinary nodes) within the multi-node communication network 100. Although the examples provided herein provide for gateway redundancy factors which are equal (e.g., $\alpha$ and $\beta$), it is noted herein that the gateway redundancy factors $\alpha$ and $\beta$ need not be equal. Adjusting the gateway redundancy factors $\alpha$ and $\beta$ may alter the ratio of gateway communication nodes and ordinary communication nodes, which may affect the density of data transmission throughout the multi-node communication network 100. By adjusting the ratio of gateway nodes to ordinary nodes within the multi-node communication network 100, the network may be tailored according to a number of factors including, but not limited to, importance of data delivery, delay requirements, bandwidth requirements, number of communication nodes 102, density of communication nodes 102, and the like.

Embodiments of the present disclosure may provide a number of advantages over previous approaches. First, the system and method of the present disclosure may provide for on-the-fly efficiency enhancements and network structuring, with no wait time. Because communication nodes 102 may effectively alter their own clustering status each time a data packet is received, the communication nodes 102 within the multi-node communication network 100 may effectively alter the passive clustering make-up of the multi-node communication network 100, and thereby provide for on-the-fly efficiency enhancements. Additionally, the system and method of the present disclosure provide for passive clustering with zero-overhead (e.g., Zero Overhead Efficient Flooding). Furthermore, the multi-node communication network 100 may allow for pseudo power control effects.

It is noted herein that preventing ordinary nodes from participating in flooding may, in some instances, result in slightly longer data transmission paths, and therefore slightly longer delays. Additionally, there may be potential for data transmission bottlenecks. However, these drawbacks are negligible as compared to the numerous advantages provided by the system and method of the present disclosure. Furthermore, the severity and/or existence of these drawbacks may be alleviated and/or eliminated by adjusting the gateway redundancy factors $\alpha$ and $\beta$. For example, the gateway redundancy factors $\alpha$ and $\beta$ may be adjusted such that no ordinary nodes are present within the multi-node communication network 100. In this example, the multi-node communication network 100 may function in the same manner as previous approaches identified herein.

During normal operation, the network 100 requires acknowledgments to ensure deliver of each data packet. Clusterhead nodes 102 are configured to receive and store acknowledgments from the nodes 102 within their respective clusters. Similarly, nodes 102 are configured to send acknowledgments only to their respective clusterhead nodes 102. Nodes 102 in overlapping areas between two clusters may send acknowledgments only to the first clusterhead node 102 to send the packet. Clusterhead nodes 102 retransmit the data packet, along with a list of acknowledging nodes 102, until all nodes 102 have acknowledged or no new acknowledgments are received for specific interval. Each non-clusterhead node 102 sends or re-sends an acknowledgment until receiving a retransmission with the nodes 102 ID in the attached acknowledgment list. Such methodology prevents any acknowledgment from requiring two or more hops.

Figure 2A:
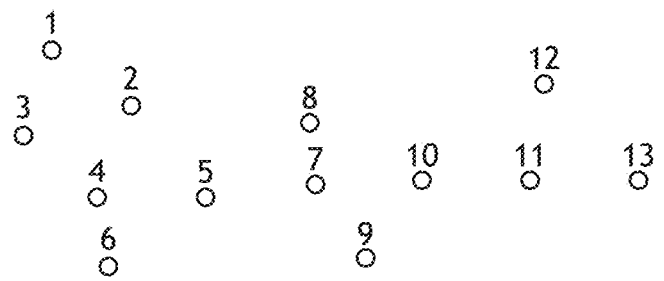
FIG. 2A illustrates a multi-node communication network, in accordance with one or more embodiments of the present disclosure.

FIG. 2A illustrates a multi-node communication network, in accordance with one or more embodiments of the present disclosure. As may be seen in FIG. 2A, the multi-node communication network may include a plurality of communication nodes.

Figure 2B:
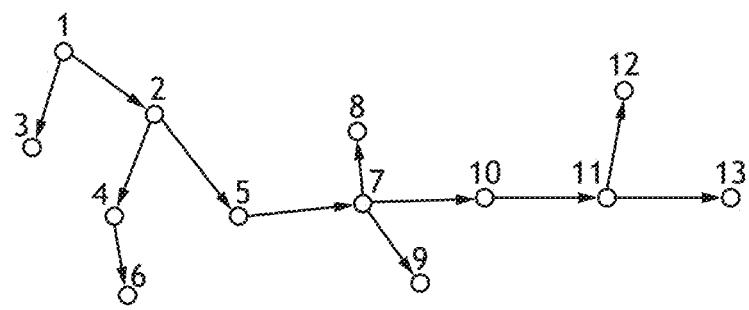
FIG. 2B illustrates data transmittal pathways through a multi-node communication network utilizing an ad hoc on-demand distance vector routing (AODV) communication protocol.
Figure 2C:
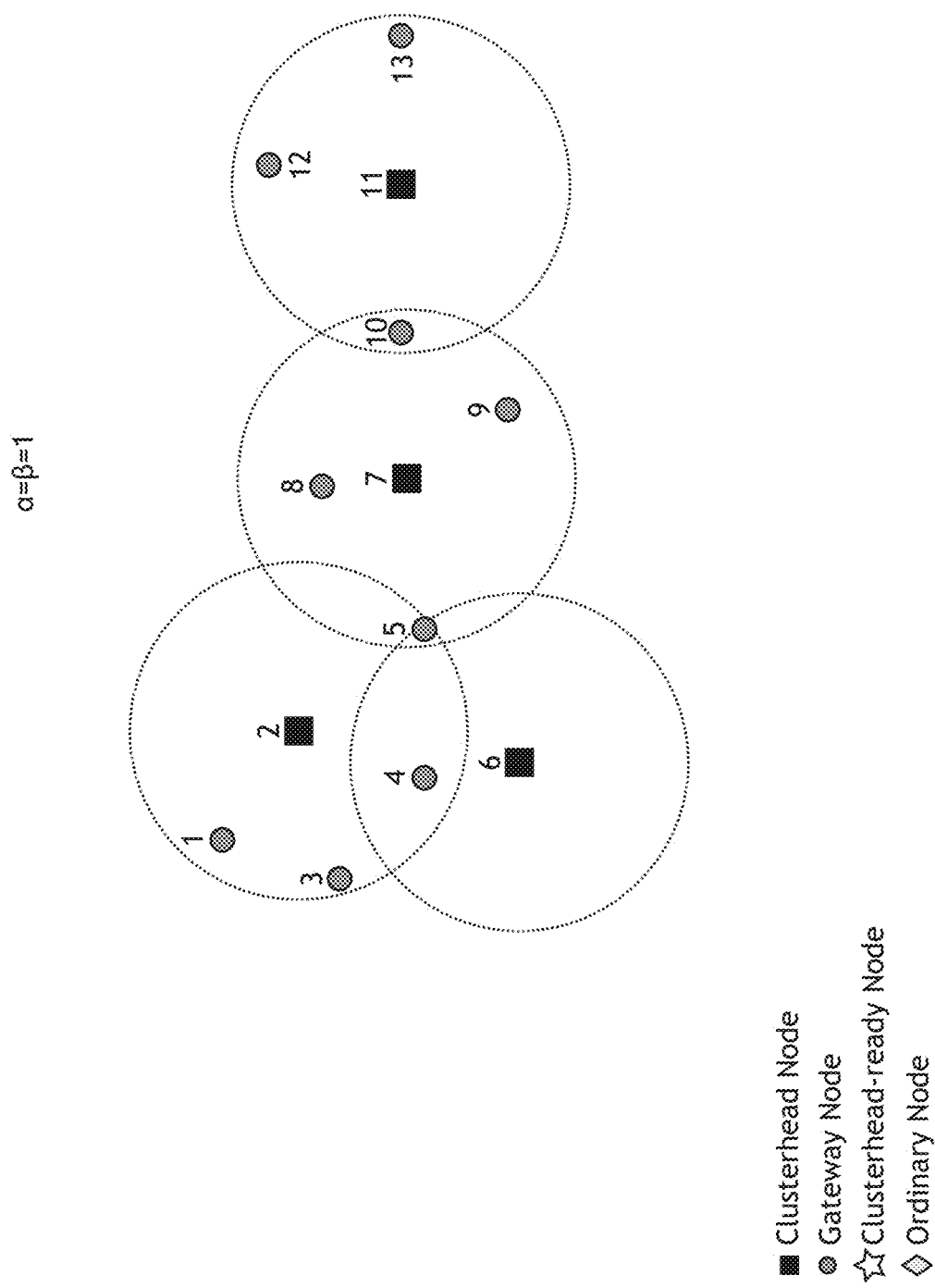
FIG. 2C illustrates a resulting clustering of a multi-node communication network utilizing an ad hoc on-demand distance vector routing (AODV) communication protocol.

FIG. 2B illustrates data transmittal pathways through a multi-node communication network utilizing an ad hoc on-demand distance vector routing (AODV) communication protocol. FIG. 2C illustrates a resulting clustering of a multi-node communication network utilizing an ad hoc on-demand distance vector routing (AODV) communication protocol.

As may be seen in FIG. 2C, using AODV, Node 2, Node 6, Node 7, and Node 11 may include clusterhead node clustering statuses in the resulting clustering, while the remaining nodes include gateway clustering statuses in the resulting clustering. The resulting clustering from AODV illustrated in FIG. 2C may be compared to resulting clusterings from EFPC and ZOEF, as will be described in further detail herein.

Figure 3:
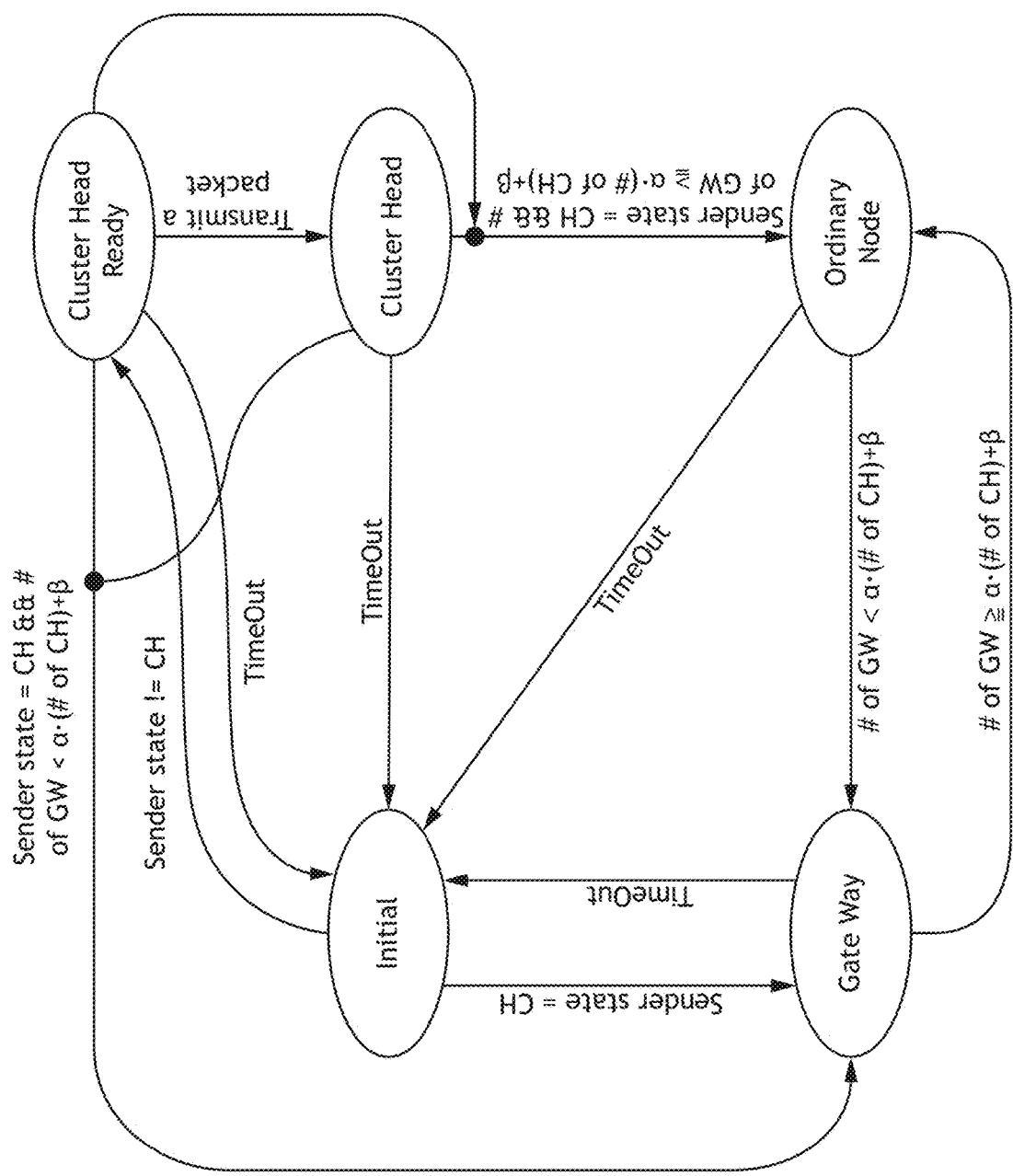
FIG. 3 illustrates a clustering state transition diagram for efficient flooding with passive flooding (EFPC)

FIG. 3 illustrates a clustering state transition diagram for efficient flooding with passive flooding (EFPC).

As noted previously herein, passive clustering may be used to cluster communication nodes 102 into multiple clustering statuses. As shown in FIG. 3, EFPC may include five separate clustering statuses: an "initial node" clustering status, a "clusterhead-ready" clustering status, an "ordinary node" clustering status, a "gateway node" clustering status, and a "clusterhead node" clustering status. With EFPC, each node may start out with an initial node clustering status. Upon receiving a data packet from a communication node other than a clusterhead node, an initial node may transition to a clusterhead-ready node. Conversely, upon receiving a data packet from a clusterhead node, an initial node may transition to a gateway node. Additionally, clusterhead-ready nodes, clusterhead nodes, ordinary nodes, and gateway nodes may all revert back to an initial node if all the clusterhead nodes within the local list of the respective nodes are timed-out. For example, a gateway node may revert back to an initial node if all the clusterhead nodes within the local list of the gateway node are timed-out.

When a clusterhead-ready node obtains and transmits a packet, it may declare its status as a clusterhead node and transition into a clusterhead node. Additionally, upon receiving a data packet from a clusterhead node, a clusterhead-ready node may transition to a gateway node if $GW<\alpha*CH+\beta$. Conversely, upon receiving a data packet from a clusterhead node, a clusterhead-ready node may transition to an ordinary node if $GW\geq\alpha*CH+\beta$.

A clusterhead node may transition to a gateway node upon receiving a data packet from another clusterhead node if $GW<\alpha*CH+\beta$. Conversely, a clusterhead node may transition to an ordinary node upon receiving a data packet from another clusterhead node if $GW\geq\alpha*CH+\beta$. A gateway node may transition to an ordinary node upon receiving a data packet if the gateway node determines $GW\geq\alpha*CH+\beta$. Conversely, upon receiving a data packet, an ordinary node may transition to a gateway node if the ordinary node determines $GW<\alpha*CH+\beta$.

Figure 4A:
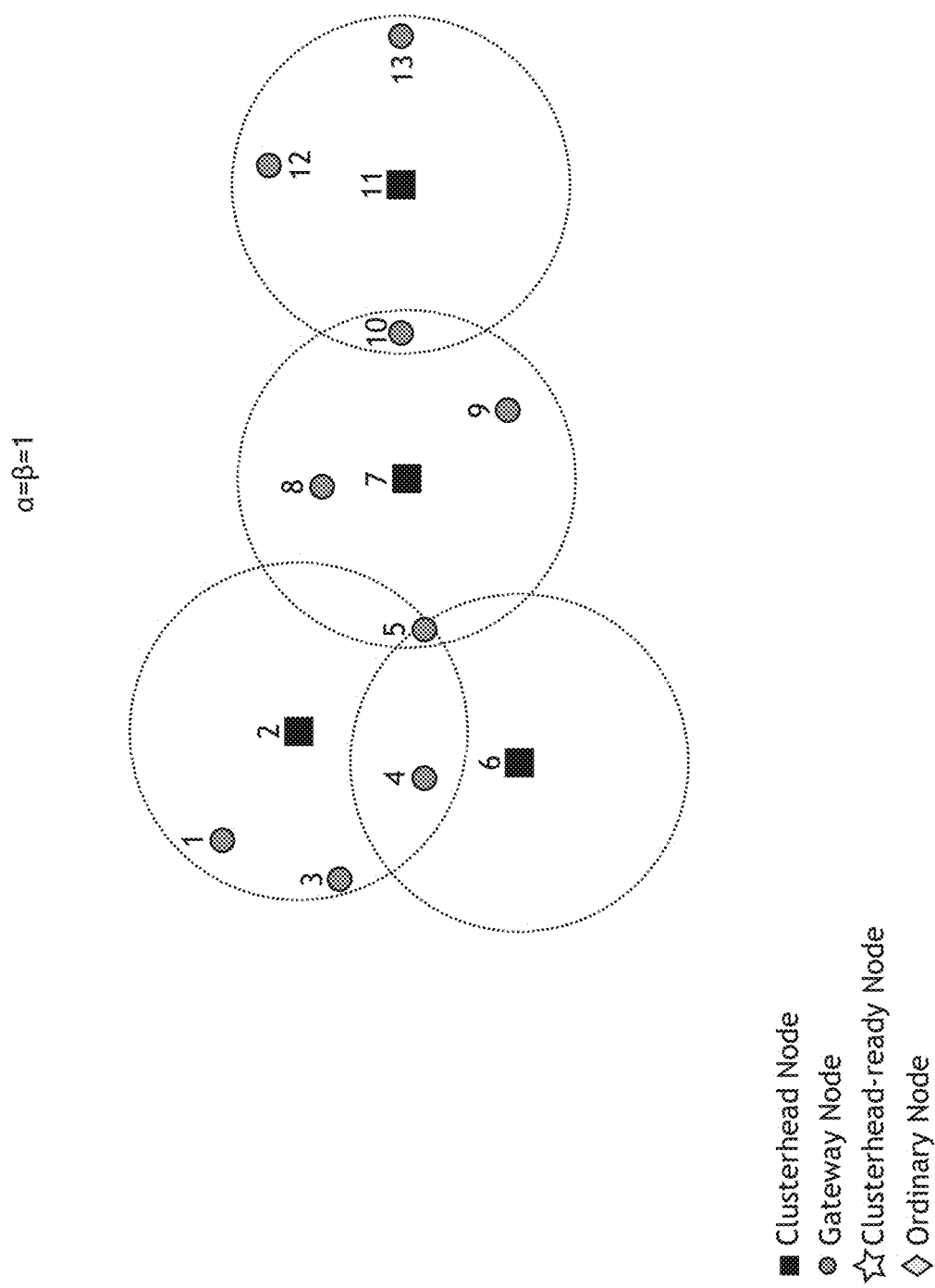
FIG. 4A illustrates a resulting clustering of a multi-node communication network utilizing efficient flooding with passive flooding (EFPC)

FIG. 4A illustrates a resulting clustering of a multi-node communication network utilizing efficient flooding with passive flooding (EFPC). In this regard, FIG. 4A illustrates a resulting clustering of the multi-node communication network depicted in FIG. 2A utilizing efficient flooding with passive flooding (EFPC) according to the state transition diagram depicted in FIG. 3.

Figure 4B:
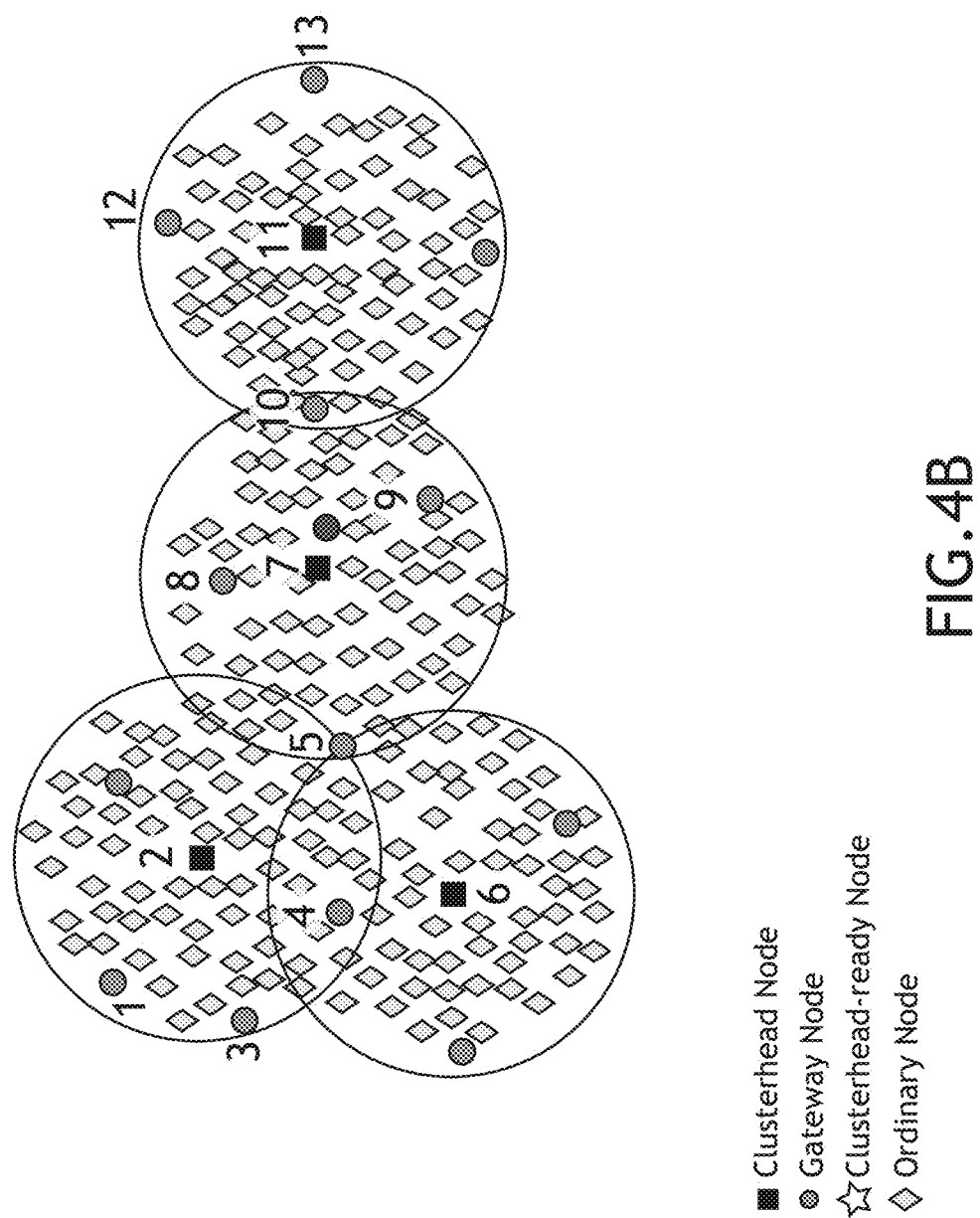
FIG. 4B illustrates a resulting clustering of a multi-node communication network utilizing efficient flooding with passive flooding (EFPC)

FIG. 4B illustrates a resulting clustering of a multi-node communication network utilizing efficient flooding with passive flooding (EFPC). In this regard, FIG. 4B illustrates a resulting clustering of a denser multi-node communication network utilizing efficient flooding with passive flooding (EFPC) according to the state transition diagram depicted in FIG. 3.

As may be seen in FIG. 4B, in a denser multi-node communication network, EFPC will result in a higher proportion of ordinary nodes to gateway nodes, and may thus result in increased overhead savings. It is contemplated herein that increasing density of a multi-node communication network may result in increasing savings utilizing EFPC.

Figure 5:
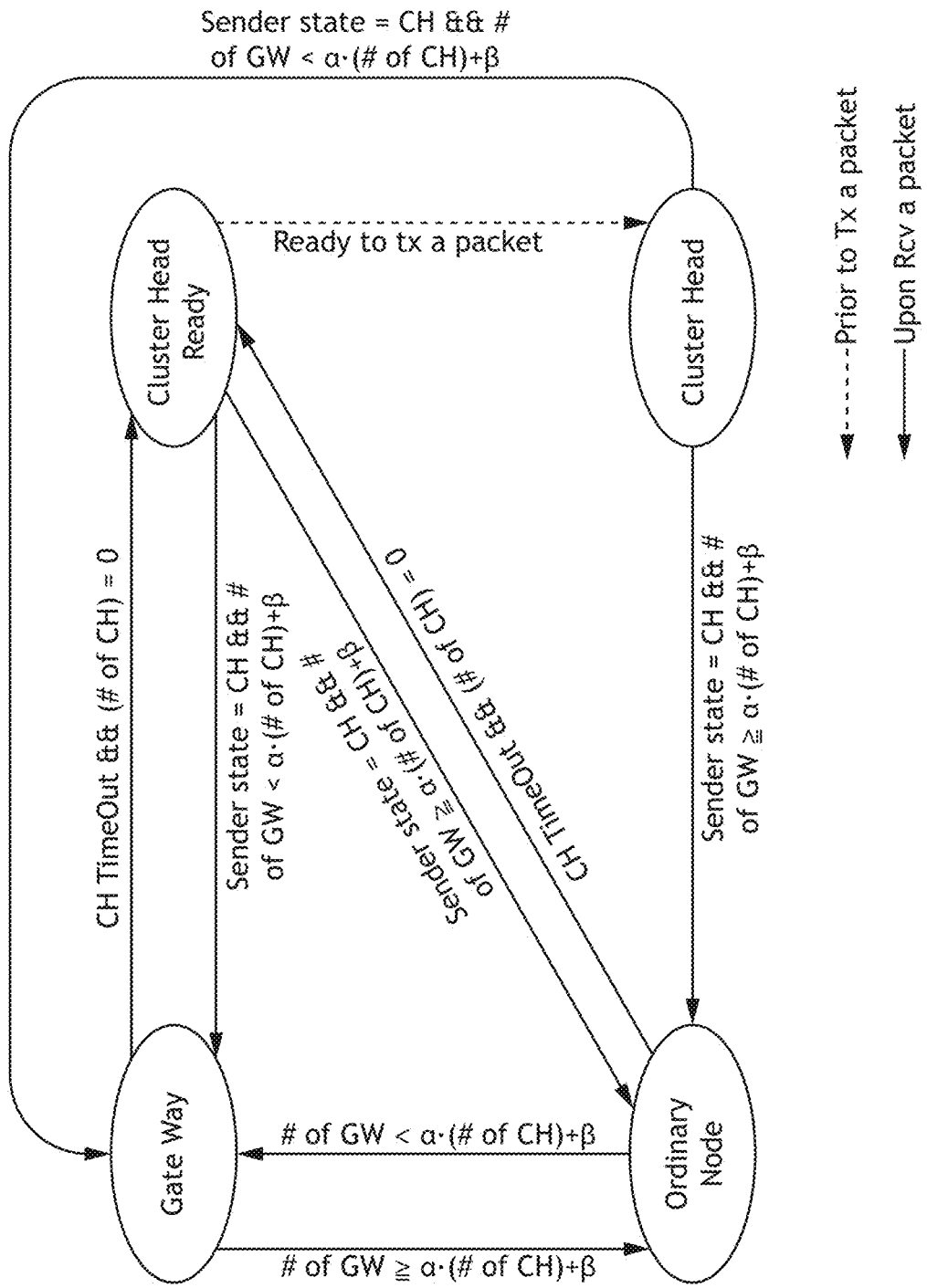
FIG. 5 illustrates a clustering state transition diagram for zero-overhead efficient flooding (ZOEF), in accordance with one or more embodiments of the present disclosure.

FIG. 5 illustrates a clustering state transition diagram for zero-overhead efficient flooding (ZOEF), in accordance with one or more embodiments of the present disclosure.

In some embodiments, as shown in FIG. 5, ZOEF may include four separate clustering statuses: an "ordinary node" clustering status, a "clusterhead-ready" clustering status, a "gateway node" clustering status, and a "clusterhead node" clustering status. As compared to EFPC in which each node may start out with an initial node clustering status, each node may start out with a clusterhead-ready clustering status under ZOEF.

In additional embodiments, upon receiving a data packet from a clusterhead node, an initial node may transition to a gateway node if $GW<\alpha*CH+\beta$. Additionally, upon receiving a data packet from a clusterhead node, a clusterhead-ready node may transition to an ordinary node if $GW\geq\alpha*CH+\beta$. Comparatively, upon receiving a data packet from a communication node other than a clusterhead node, a clusterhead-ready node may subsequently declare its status as a clusterhead node and transition into a clusterhead node upon transmitting the data packet.

In embodiments, a clusterhead node may transition to a gateway node upon receiving a data packet from another clusterhead node if $GW<\alpha*CH+\beta$. Conversely, a clusterhead node may transition to an ordinary node upon receiving a data packet from another clusterhead node if $GW\geq\alpha*CH+\beta$. A gateway node may transition to an ordinary node upon receiving a data packet if the gateway node determines $GW\geq\alpha*CH+\beta$. Conversely, upon receiving a data packet, an ordinary node may transition to a gateway node if the ordinary node determines $GW<\alpha*CH+\beta$.

In some embodiments, ordinary nodes and gateway nodes may all revert back to clusterhead-ready nodes if all the clusterhead nodes within the local list of the respective nodes are timed-out. For example, a gateway node may revert back to a clusterhead-ready node if all the clusterhead nodes within the local list of the gateway node are timed-out.

It is noted herein that the state transition diagram for ZOEF depicted in FIG. 5 shares some similarities with the state transition diagram for EFPC depicted in FIG. 3. However, as will be described in further detail herein, these state transition differences between ZOEF and EFPC may result in similar or drastically different resulting clusterings, depending on the multi-node communication network at hand. As compared to EFPC, ZOEF may provide for passive clustering within waveforms which exhibit completely used headers. In this regard, ZOEF may be able to implement passive clustering even in waveforms which do not have to extra bits, as is required with EFPC. It will be appreciated that the single hop acknowledgment methodology described herein may be implemented in an EFPC, ZOEF, or other clustering architecture.

Figure 6A:
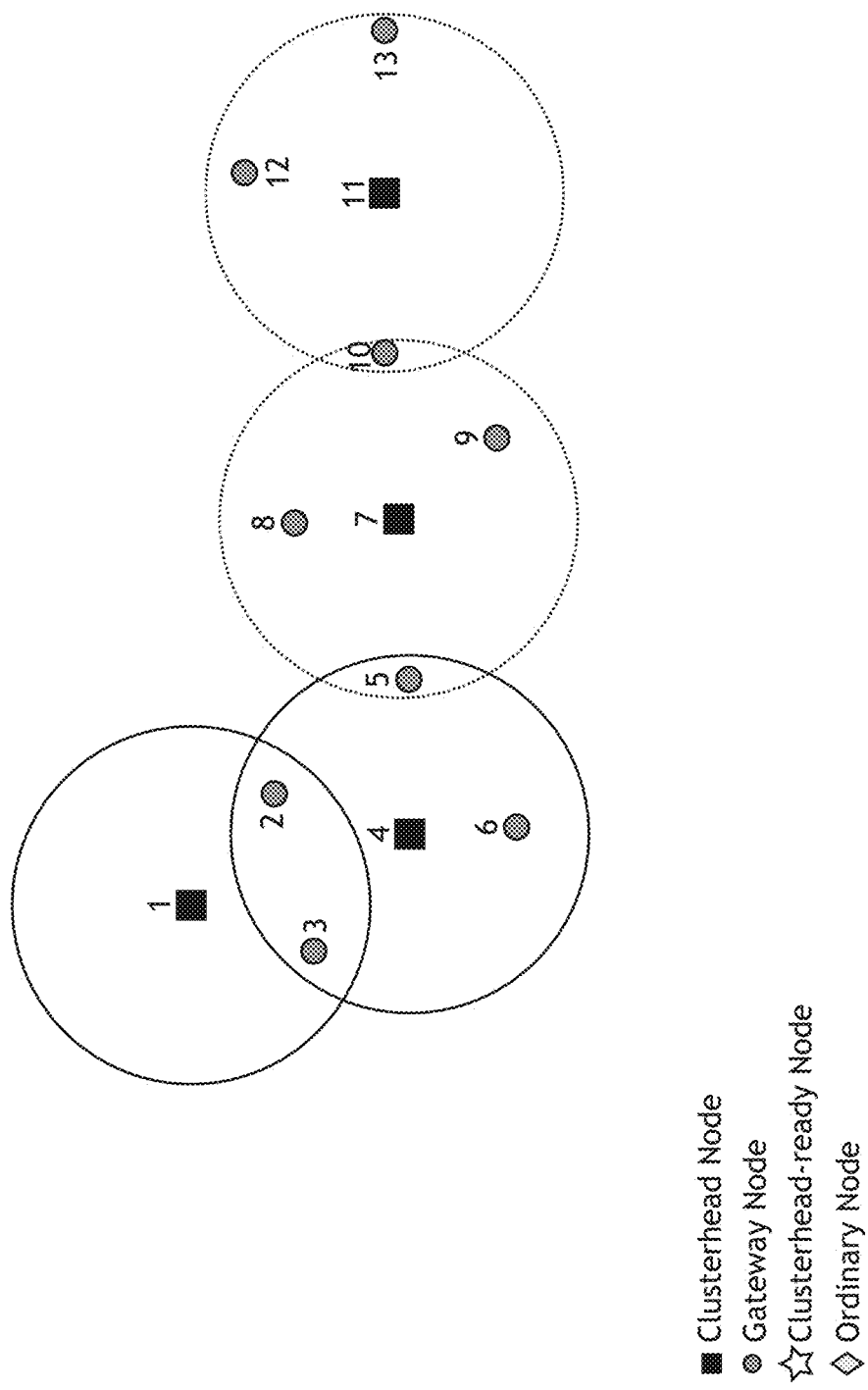
FIG. 6A illustrates a resulting clustering of a multi-node communication network utilizing zero-overhead efficient flooding (ZOEF), in accordance with one or more embodiments of the present disclosure.

FIG. 6A illustrates a resulting clustering of a multi-node communication network utilizing zero-overhead efficient flooding (ZOEF), in accordance with one or more embodiments of the present disclosure. In this regard, FIG. 6A illustrates a resulting clustering of the multi-node communication network depicted in FIG. 2A utilizing zero-overhead efficient flooding (ZOEF) according to the state transition diagram depicted in FIG. 5.

Comparing the resulting clustering in FIG. 6A to the resulting clusterings in FIGS. 2C and 4A it may be seen that ZOEF results in slightly different clustering as compared to AODV and EFPC. For example, under ZOEF, Node 1 results in a clusterhead node, whereas Node 1 results in a gateway node under both AODV and ZOEF.

Figure 6B:
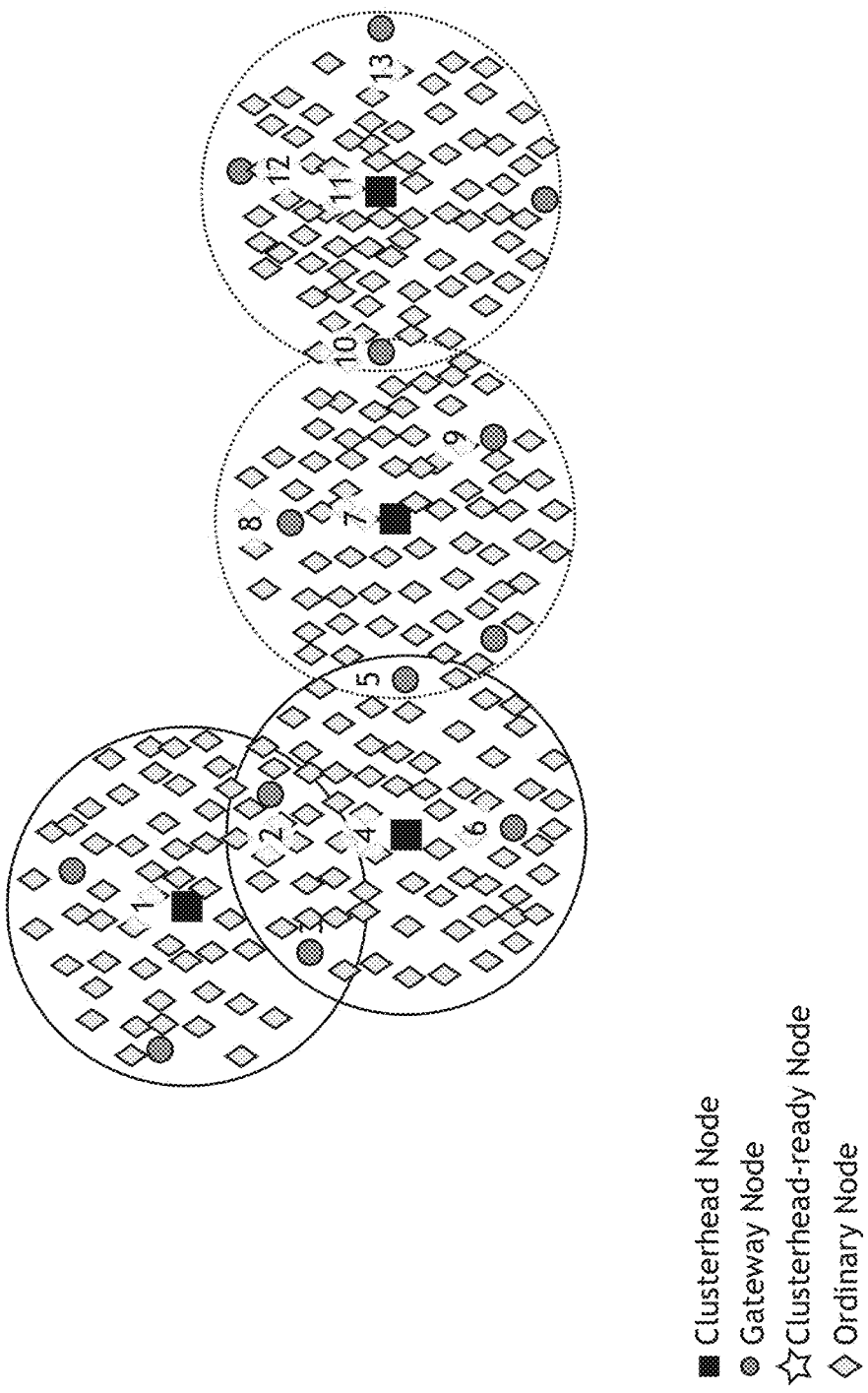
FIG. 6B illustrates a resulting clustering of a multi-node communication network utilizing zero-overhead efficient flooding (ZOEF), in accordance with one or more embodiments of the present disclosure.

FIG. 6B illustrates a resulting clustering of a multi-node communication network utilizing zero-overhead efficient flooding (ZOEF), in accordance with one or more embodiments of the present disclosure. In this regard, FIG. 6B illustrates a resulting clustering of a denser multi-node communication network utilizing zero-overhead efficient flooding (ZOEF) according to the state transition diagram depicted in FIG. 5.

As may be seen in FIG. 6B, in a denser multi-node communication network, ZOEF will result in a higher proportion of ordinary nodes to gateway nodes, and may thus result in increased overhead savings. Comparing the resulting clustering in FIG. 6B to the resulting clustering in FIG. 4B, it may be seen that ZOEF results in slightly different clustering as compared to EFPC.

It is further noted herein that the advantages of ZOEF may be most apparent in high density multi-node communication networks 100. As the density of a multi-node communication network 100 increases, the network overhead savings between embodiments of the present disclosure and previous approaches (e.g., AODV) increases. For example, as the density of a multi-node communication network 100 increases, the ratio of ordinary nodes (which do not participate in flooding) and gateway nodes increases, thereby reducing unnecessary data packet transmission and total network overhead. Furthermore, as compared to EFPC which requires two dedicated bits, ZOEF may provide for passive clustering and increased overhead savings in a multi-node communication network utilizing waveforms without two dedicated bits.

Figure 7:
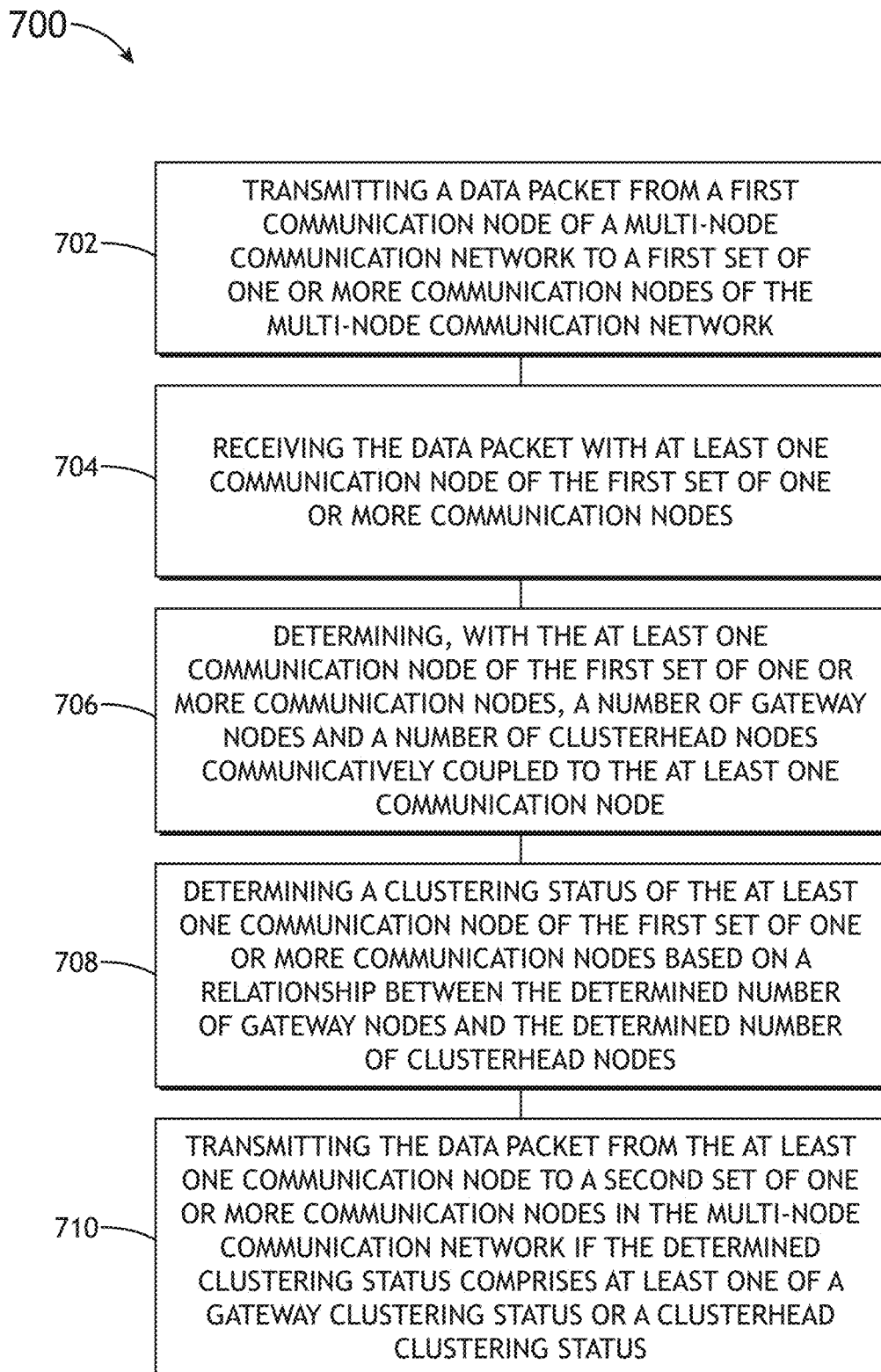
FIG. 7 illustrates a flowchart of a method for zero-overhead efficient flooding (ZOEF), in accordance with one or more embodiments of the present disclosure.

FIG. 7 illustrates a flowchart of a method 700 for zero-overhead efficient flooding (ZOEF), in accordance with one or more embodiments of the present disclosure. It is noted herein that the steps of method 700 may be implemented all or in part by multi-node communication network 100. It is further recognized, however, that the method 700 is not limited to the multi-node communication network 100 in that additional or alternative system-level embodiments may carry out all or part of the steps of method 700.

In a step 702, a data packet is transmitted from a first communication node of a multi-node communication network to a first set of one or more communication nodes of the multi-node communication network. In embodiments, the data packet may include a broadcast address indicative of a clustering status of the first communication node. For example, as shown in FIG. 4A, a first communication node 102a (Node 1) of a multi-node communication network 100 may transmit a data packet to a second communication node 102b (Node 2) and a third communication node 102c (Node 3), wherein the data packet includes a broadcast address indicative of the clustering status of the first communication node.

In embodiments, the data packet may include a single broadcast address indicative of the clustering status of the first communication node. Thus, passive clustering may be implemented through the use of individual broadcast addresses within the data packet. In embodiments, the single broadcast address in a data packet may include one of three separate broadcast addresses. For example, a first broadcast address may be indicative of a gateway node clustering status, a second broadcast address may be indicative of a clusterhead node clustering status, and a third broadcast address may be indicative of an ordinary node clustering status. For instance, a gateway node within the multi-node communication network 100 may transmit data packets including a single broadcast address indicative of a gateway node clustering status, a clusterhead node within the multi-node communication network 100 may transmit data packets including a single broadcast address indicative of a clusterhead node clustering status, and the like.

In a step 704, the data packet is received by at least one communication node of the first set of one or more communication nodes. For example, the second communication node 102b (Node 2) may receive the data packet from the first communication node 102a (Node 1).

In a step 706, the at least one communication node of the first set of communication nodes determines a number of gateway nodes and a number of clusterhead nodes communicatively coupled to the at least one communication node. For example, as noted previously herein, a communication node 102 of the multi-node communication network 100 may determine a number of gateway nodes and a number of clusterhead nodes communicatively coupled to the communication node 102 each time the communication node 102 receives a data packet from a gateway node or a clusterhead node. In embodiments, a communication network 100 may determine a number of gateway nodes and a number of clusterhead nodes communicatively coupled to the communication node 102 by referencing a local list stored in the memory 106 of the communication node 102.

In a step 708, the at least one communication node of the first set of communication nodes determines a clustering status of the at least one communication node based on a relationship between the determined number of gateway nodes and the determined number of clusterhead nodes. For example, as shown in FIG. 4A, Node 4 (e.g., communication node 102d) may determine a clustering status of Node 4 based on a relationship between the determined number of gateway nodes and the determined number of clusterhead nodes communicatively coupled to Node 4. In embodiments, if Equation 1 is found to be true, the controller 104d may be configured to determine the clustering status of Node 4 to be an ordinary node clustering status. Conversely, if Equation 2 is found to be true, a controller 104*d* may be configured to determine the clustering status of Node 4 to be a gateway node clustering status.

In a step 710, a data packet is transmitted from the at least one communication node to a second set of one or more communication nodes if the determined clustering status of the at least one communication node includes a gateway clustering status or a clusterhead clustering status. In embodiments, the data packet may include a single broadcast address indicative of the clustering status of the first communication node. In additional embodiments, a communication node 102 may refrain from participating in flooding (e.g., not transmit the data packet) if the determined clustering status of the communication node 102 is an ordinary node clustering status.

Figure 8:
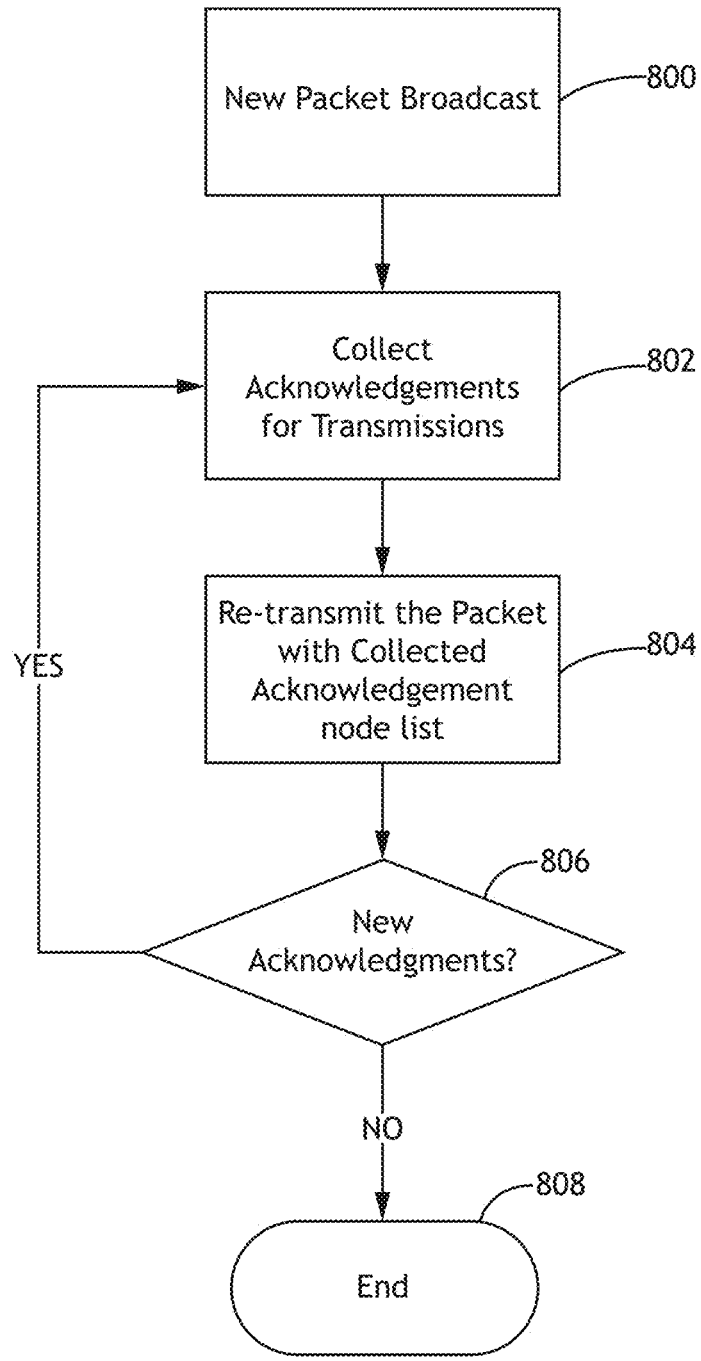
FIG. 8 illustrates a flowchart of a method for clusterhead nodes to maintain acknowledgments in a MANET, in accordance with one or more embodiments of the present disclosure.

FIG. 8 illustrates a flowchart of a method for maintaining acknowledgments in a MANET, in accordance with one or more embodiments of the present disclosure. In a MANET utilizing a clustering structure (such as illustrated in FIGS. 4A, 4B, 6A, and 6B), clusterheads are responsible for reliable delivery of the information to associated gateway nodes and ordinary nodes. During transmissions, a clusterhead receives 800 a packet for broadcast and transmits the packet to all gateway nodes and ordinary nodes within the corresponding cluster. For example, with reference to FIG. 4A, nodes 2, 6, 7, and 11 are clusterheads; when an ordinary node or gateway node (such as node 1) transmits a packet, the corresponding clusterhead (node 2) receives the packet and distributes the packet to all other nodes within the cluster (gateway nodes 3, 4, and 5). The gateway nodes transmit the packet to associated non-transmitting clusterhead nodes (nodes 6 and 7) which then re-transmit to the ordinary nodes and gateway nodes within their corresponding clusters.

Each clusterhead receives 802 and maintains a list of acknowledgements from each member node in the cluster. The clusterhead includes the current list of nodes that have sent acknowledgements in every retransmission 804. Whenever a node receives a packet transmission from a clusterhead, the node sends an acknowledgment to the clusterhead for collection 802 and inclusion in the list of acknowledgments. In at least one embodiment, the clusterhead retransmits 804 the packet every time it determines 806 that a new acknowledgment is received. Alternatively, or in addition, the clusterhead may retransmit 804 after a specified time has elapsed since the last new acknowledgment, and/or after a specific number of new acknowledgments.

In at least one embodiment, gateway nodes (or ordinary nodes in overlapping clusters) deliver acknowledgments to "upstream" clusterheads. Alternatively, or in addition, clusterheads for the overlapping clusters maintain and share cluster maps for surrounding clusters and track overlapping nodes. The clusterheads maintain the current list of acknowledgments for all nodes exclusively in their cluster and downstream nodes in any overlapping cluster areas. Alternatively, or in addition, each node in an overlapping cluster area delivers an acknowledgment to the first clusterhead that transmits the packet to the node.

In at least one embodiment, the clusterhead attaches the current list of acknowledgments to each retransmission. Non-clusterhead nodes respond to those retransmissions as described more fully herein. In at least one embodiment, the list of acknowledgments is appended to the packet; alternatively, the list of acknowledgments may be included as part of the header of the retransmission such that non-clusterhead nodes may disregard the retransmission if such node's acknowledgment is already included.

In at least one embodiment, when no new acknowledgements are forthcoming, the clusterhead ends 808 retransmission of the packet. In at least one embodiment, the clusterheads may back-propagate the list of acknowledgments to upstream clusterheads via interstitial gateway nodes.

Figure 9:
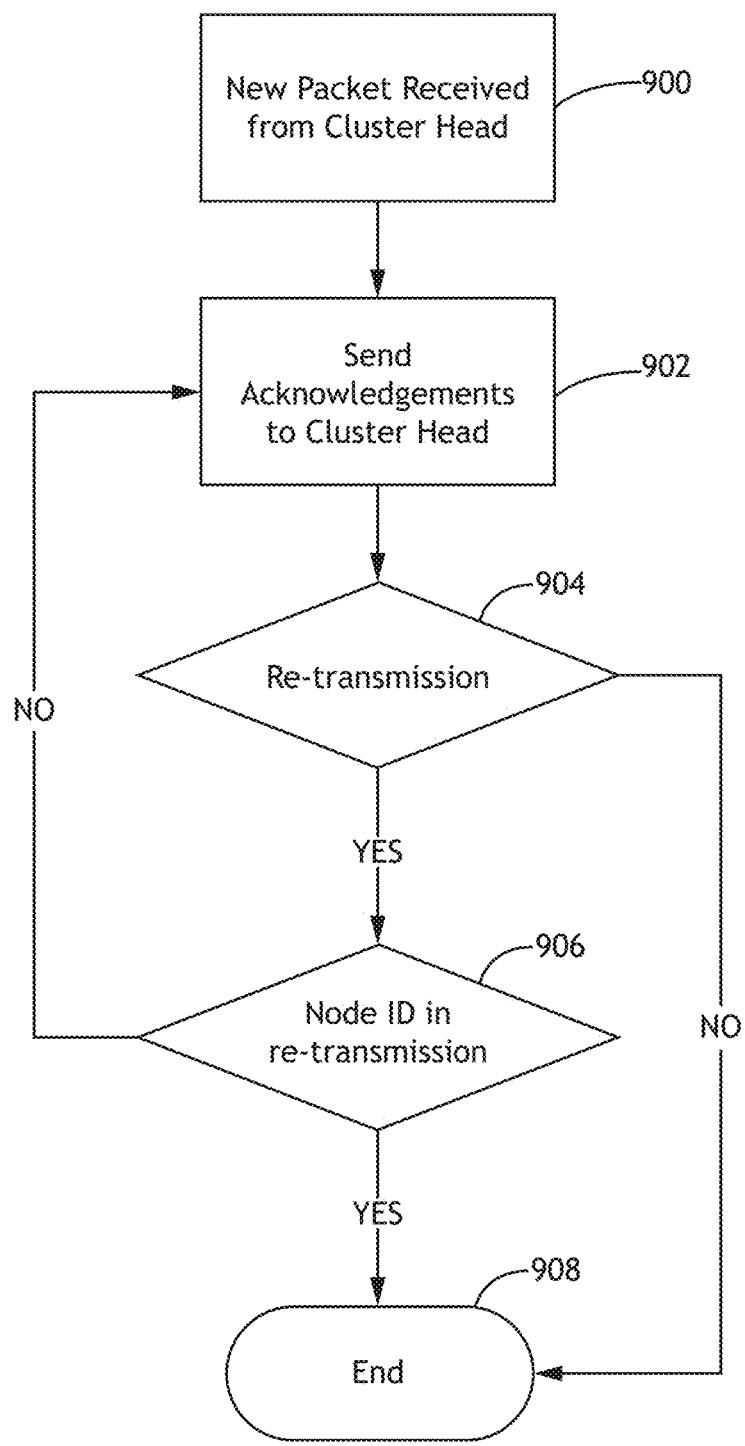
FIG. 9 illustrates a flowchart of a method for non-clusterhead nodes to maintain acknowledgments in a MANET, in accordance with one or more embodiments of the present disclosure.

FIG. 9 illustrates a flowchart of a method for maintaining acknowledgments in a MANET, in accordance with one or more embodiments of the present disclosure. In a MANET utilizing a clustering structure with clusterheads embodying an acknowledgment collection methodology such as in FIG. 8, clusterheads transmit packets to nodes in their cluster. Each node receives 900 the packet from the clusterhead. In at least one embodiment, where a node is in an overlapping area of two or more clusters, the node may receive 900 the packet from each corresponding clusterhead; or, alternatively, from the first clusterhead, disregarding any other transmissions of the packet from other clusterheads.

Each node sends 902 an acknowledgment to the clusterhead that originally sent the packet. The node may then wait for a retransmission from the clusterhead. If the node determines 904 that retransmission is not received for a predetermined period, the node may terminate 908 the acknowledgment process.

If the node determines 904 that a retransmission from the clusterhead has been received, the node may further determine 906 if the retransmission includes the node's acknowledgment. If the node determines 906 that the retransmission does not include the listing of the node's acknowledgment, the node may re-send 902 the acknowledgment to the clusterhead.

When the node receives a retransmission from the clusterhead including the nodes acknowledgment, or the node does not receive a retransmission from the clusterhead within a predetermined interval, the node may terminate 908 the acknowledgment process.

In at least one embodiment, gateway nodes (or ordinary nodes in overlapping clusters) send 902 acknowledgments to upstream clusterheads, or the first clusterhead that sends the corresponding packet.

A MANET utilizing the acknowledgment collection methodology described herein may reliability maintain packet integrity with minimal overhead. Delivery is assured locally within each cluster. Acknowledgments may be shared between clusterheads and a total network topology may be mapped.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

The invention claimed is:

1. A clusterhead communication node of a multi-node communication network, the communication node comprising:
   a communication interface; and
   a controller communicatively coupled to the communication interface, the controller configured to:
      receive a data packet, via the communication interface, from a first additional communication node of the multi-node communication network in a cluster corresponding to the clusterhead communication node;
      transmit the data packet, via the communication interface, to at least a second additional communication node of the multi-node communication network in the cluster;
      receive an acknowledgment from the second additional communication node and add the acknowledgment to a list of node acknowledgments;
      include the list of node acknowledgments in a retransmission of the data packet;
      determine that no new acknowledgments are received for a specified interval; and
      end all retransmissions of the data packet.

2. The communication node of claim 1, wherein the controller is further configured to:
   receive an acknowledgment from a third additional communication node;
   update the list of node acknowledgments to include the acknowledgment from the third additional communication node; and
   retransmit the data packet and updated list of node acknowledgments.

3. The communication node of claim 1, wherein the controller is further configured to:
   determine that all nodes in the cluster have sent acknowledgments; and end all retransmissions of the data packet.

4. The communication node of claim 1, wherein:
   the controller is further configured to:
      receive a list of acknowledgments from a downstream clusterhead via an intervening gateway node; and
      forward the list of acknowledgments from the downstream clusterhead to an upstream gateway node; and
   any acknowledgments from other clusterhead communication nodes are excluded from retransmissions of the data packet.

5. The communication node of claim 1, wherein the list of acknowledgments is appended to the data packet during retransmissions.

6. The communication node of claim 1, wherein the list of acknowledgments is included in a header to the data packet during retransmissions.

7. A method for managing acknowledgments in a multi-node communication network comprising:
   receiving a data packet, via a communication interface in a clusterhead communication node, from a first additional communication node in a cluster corresponding to the clusterhead communication node;
   transmitting the data packet, via the communication interface, to at least a second additional communication node of the multi-node communication network in the cluster;
   receiving an acknowledgment from the second additional communication node and adding the acknowledgment to a list of node acknowledgments;
   including the list of node acknowledgments in a retransmission of the data packet;
   determining that no new acknowledgments are received for a specified interval; and
   ending all retransmissions of the data packet.

8. The method of claim 7, further comprising:
   receiving an acknowledgment from a third additional communication node;
   updating the list of node acknowledgments to include the acknowledgment from the third additional communication node; and
   retransmitting the data packet and updated list of node acknowledgments.

9. The method of claim 7, further comprising:
   determining that all nodes in the cluster have sent acknowledgments; and
   end all retransmissions of the data packet.

10. The method of claim 7, further comprising:
    receiving a list of acknowledgments from a downstream clusterhead via an intervening gateway node; and
    forwarding the list of acknowledgments from the downstream clusterhead to an upstream gateway node,
    wherein any acknowledgments from other clusterhead communication nodes are excluded from retransmissions of the data packet.

11. The method of claim 7, wherein the list of acknowledgments is appended to the data packet during retransmissions.

12. The method of claim 7, wherein the list of acknowledgments is included in a header to the data packet during retransmissions.

13. The method of claim 7, further comprising:
    receiving the data packet, via a communication interface in second additional communication node;
    transmitting an acknowledgment, via the communication interface, to clusterhead communication node;
    receiving a retransmission of the data packet from the clusterhead communication node;
    determining that the retransmission does not include the acknowledgment; and
    resending the acknowledgment to the clusterhead communication node.

* * * * *